United States Patent
Zhu et al.

(10) Patent No.: US 11,244,095 B2
(45) Date of Patent: Feb. 8, 2022

(54) NUMERICALLY ESTIMATING A PRE-STAMPED SHAPE OF A WORKPIECE USED FOR MANUFACTURING A PRODUCT/PART WITH DEEP DRAW METAL STAMPING

(71) Applicant: Livermore Software Technology Corporation, Livermore, CA (US)

(72) Inventors: Xinhai Zhu, Pleasanton, CA (US); Houfu Fan, Livermore, CA (US); Jinglin Zheng, Livermore, CA (US)

(*) Notice: Subject to any disclaimer, the term of this patent is extended or adjusted under 35 U.S.C. 154(b) by 271 days.

(21) Appl. No.: 16/427,361

(22) Filed: May 31, 2019

(65) Prior Publication Data

US 2020/0380087 A1  Dec. 3, 2020

(51) Int. Cl.
| | |
|---|---|
| G06F 30/23 | (2020.01) |
| G06F 17/12 | (2006.01) |
| G06T 19/20 | (2011.01) |
| G06T 17/20 | (2006.01) |
| G06F 119/18 | (2020.01) |

(52) U.S. Cl.
CPC .............. *G06F 30/23* (2020.01); *G06F 17/12* (2013.01); *G06T 17/205* (2013.01); *G06T 19/20* (2013.01); *G06F 2119/18* (2020.01); *G06T 2219/2021* (2013.01)

(58) Field of Classification Search
CPC .................................. G06F 30/23; G06F 17/12
See application file for complete search history.

(56) References Cited

U.S. PATENT DOCUMENTS

| | | | | | |
|---|---|---|---|---|---|
| 5,379,227 | A | * | 1/1995 | Tang | B21D 22/26 700/98 |
| 5,963,459 | A | * | 10/1999 | Burnett | G06T 17/20 703/5 |
| 6,718,291 | B1 | * | 4/2004 | Shapiro | G06F 30/00 703/2 |
| 6,876,956 | B1 | * | 4/2005 | Cirak | G06F 30/23 703/2 |

(Continued)

OTHER PUBLICATIONS

Sun et al. ("An Automatic Method for Complete Triangular Mesh Conversion into Quadrilateral Mesh for Multiple Domain Geometry", Terr. Atmos. Ocean. Sci.,, 2016, pp. 139-152) (Year: 2016).*

(Continued)

*Primary Examiner* — Iftekhar A Khan

(57) ABSTRACT

A 3-D mesh model represents 3-D geometry of a product/part manufactured with deep draw metal forming process. The 3-D model contains nodes connected by shell finite elements. 3-D model is modified by converting each quadrilateral shell finite element to triangular shell finite elements. Respective averaged nodal curvatures of all nodes of the 3-D model is calculated based on the 3-D geometry. A 2-D mesh model is created by unfolding the 3-D model to a plane while maintaining all corresponding triangular shell finite elements between the 2-D and the 3-D models as similar triangles. An estimated pre-stamped shape of a workpiece used for manufacturing the product/part is obtained by iteratively updating the 2-D model with a set of internal nodal forces with respect to the 3-D model and with a set of nodal force adjustments based on the respective averaged nodal curvatures.

15 Claims, 13 Drawing Sheets

(56) References Cited

U.S. PATENT DOCUMENTS

| | | | | |
|---|---|---|---|---|
| 7,167,816 | B1* | 1/2007 | Olovsson | G06T 17/20 703/1 |
| 7,382,367 | B1* | 6/2008 | Lu | G06T 17/20 345/419 |
| 7,440,879 | B2* | 10/2008 | Breitfeld | G06F 30/23 703/6 |
| 7,542,889 | B2* | 6/2009 | Hillmann | G05B 19/4099 703/6 |
| 7,660,480 | B1* | 2/2010 | Wu | G06T 17/20 382/264 |
| 8,190,408 | B2* | 5/2012 | Zhu | G06F 30/23 703/2 |
| 8,271,237 | B2* | 9/2012 | Borrvall | G06F 30/23 703/2 |
| 8,525,831 | B2* | 9/2013 | Zhang | G01N 29/0654 345/420 |
| 8,612,186 | B2* | 12/2013 | Wu | G06F 30/23 703/2 |
| 8,768,660 | B2* | 7/2014 | Wu | G06F 30/23 703/2 |
| 9,430,594 | B2* | 8/2016 | Zhu | G06F 30/23 |
| 10,331,809 | B2* | 6/2019 | Hirose | G06F 30/23 |
| 10,467,359 | B2* | 11/2019 | Zhu | G06F 30/20 |
| 11,120,180 | B2* | 9/2021 | Zhu | G06F 30/23 |
| 2006/0103648 | A1* | 5/2006 | Wu | G06F 30/23 345/423 |
| 2009/0271156 | A1* | 10/2009 | Kageura | G06T 17/20 703/1 |
| 2009/0299702 | A1* | 12/2009 | Grimes | G06F 30/23 703/1 |
| 2011/0093243 | A1* | 4/2011 | Tawhai | G06T 17/20 703/2 |
| 2011/0231163 | A1* | 9/2011 | Zhu | G06F 30/23 703/2 |
| 2011/0295570 | A1* | 12/2011 | Zhu | G06F 30/23 703/2 |
| 2015/0039273 | A1* | 2/2015 | Zhu | G06F 30/23 703/2 |
| 2015/0347650 | A1* | 12/2015 | Hallquist | G06F 30/15 703/2 |
| 2016/0210385 | A1* | 7/2016 | Zhu | G06F 30/23 |
| 2018/0067468 | A1* | 3/2018 | Zhu | G05B 19/402 |
| 2019/0065646 | A1* | 2/2019 | Zhu | G06F 30/23 |

OTHER PUBLICATIONS

Mamalis et al. ("Simulation of sheet metal forming using explicit finite-element techniques: effect of material and forming characteristics Part 1. Deep-drawing of cylindrical cups", Journal of Materials Processing Technology 72 (1997) 48-60) (Year: 1997 ).*

* cited by examiner

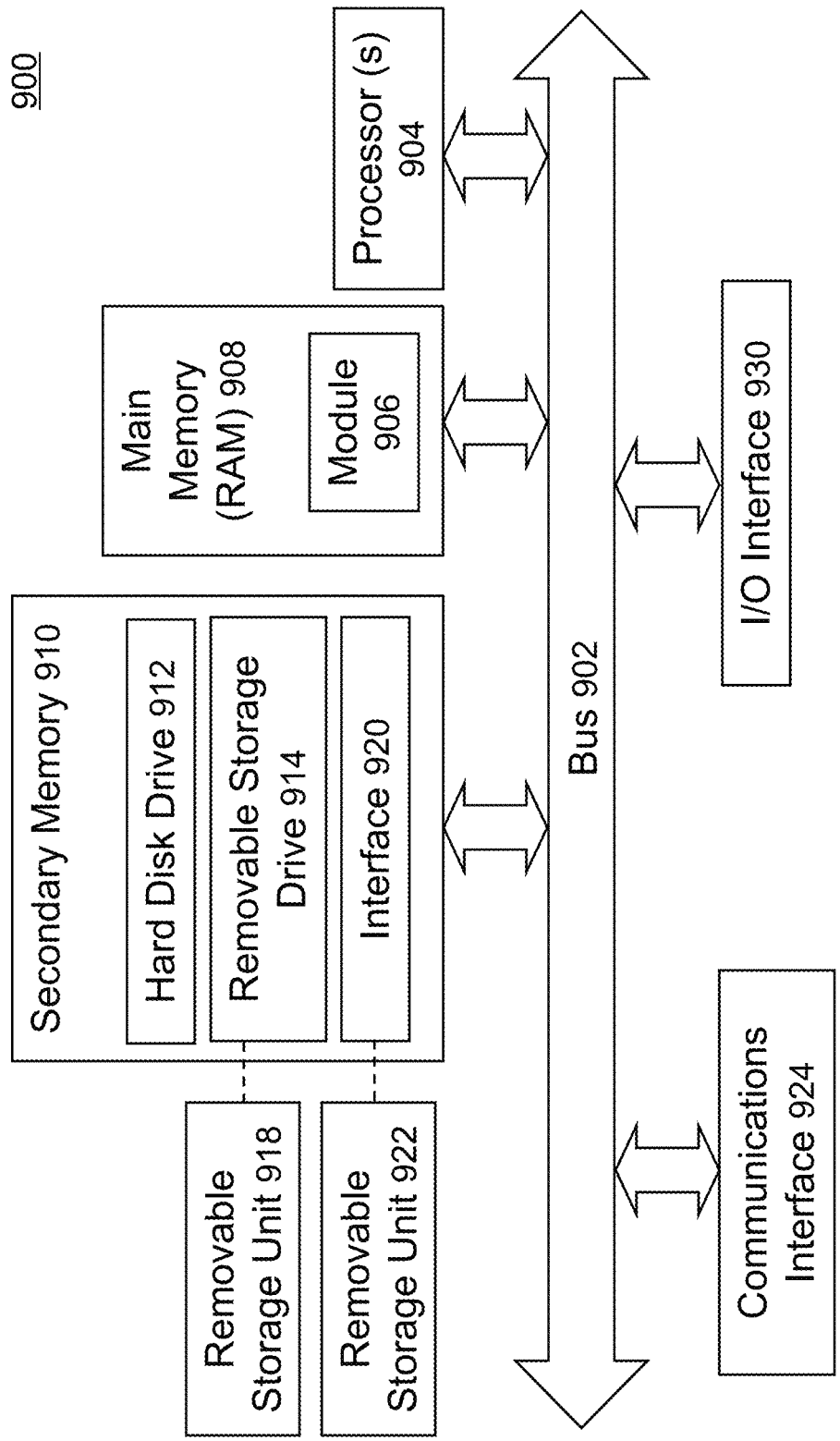

NUMERICALLY ESTIMATING A PRE-STAMPED SHAPE OF A WORKPIECE USED FOR MANUFACTURING A PRODUCT/PART WITH DEEP DRAW METAL STAMPING

FIELD

This patent document generally relates to computer-aided engineering analysis, more particularly to methods and systems for numerically estimating a pre-stamped shape of a workpiece used for manufacturing a product/part with deep draw metal stamping.

BACKGROUND

With advent of computer technology, computer aided engineering (CAE) analysis (e.g., finite element analysis (FEA)) have been used for assisting engineers/scientists to design products and manufacturing procedures. One of the manufacturing procedures is deep draw metal forming, which requires engineering expertise in many aspects of the deep draw metal forming including, but not limited to, the design of tool surface, the thickness and the shape of the blank (e.g., workpiece).

There are many problems, shortcomings in prior art approaches for estimating the initial shape of a workpiece, for example, product/part having a complex geometry. Therefore, there would be a need for improved methods of numerically estimating a pre-stamped shape of a workpiece used for manufacturing a product/part with deep draw metal stamping.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Systems and methods of numerically estimating a pre-stamped shape of a workpiece used for manufacturing a product/part are disclosed. According to one aspect of the disclosure, a three-dimensional (3-D) mesh model represents the 3-D geometry of a product/part manufactured with deep draw metal forming process. The 3-D model contains nodes connected by shell finite elements. The 3-D mesh model is modified by converting quadrilateral shell finite element to triangular shell finite elements, if there are at least one quadrilateral shell finite element in the 3-D mesh model. Respective averaged nodal curvatures of all nodes of the 3-D mesh model is calculated based on the 3-D geometry. A two-dimensional (2-D) mesh model is created by unfolding the 3-D mesh model to a plane while maintaining all of the corresponding triangular shell finite elements between the 2-D mesh model and the 3-D mesh model as similar triangles. An estimated pre-stamped shape of a workpiece used for manufacturing the product/part is obtained by iteratively updating the 2-D model with a set of internal nodal forces with respect to the 3-D model and with a set of nodal force adjustments based on the respective averaged nodal curvatures.

In another aspect, calculations of the respective averaged nodal curvatures further include calculating an averaged edge curvature of an edge that is shared by two adjacent triangular shell finite elements for all edges in the 3-D mesh model; and then calculating the averaged nodal curvature of each node in the 3-D mesh model by averaging respective averaged edge curvatures of all edges connected to said each node.

In yet another aspect, unfolding the 3-D mesh model includes solving a set of simultaneous equations for two unknown nodal coordinates at each node of the 2-D mesh model. Simultaneous equations are set up from theorems of similar triangles of the corresponding triangular shell finite elements between the 3-D mesh model and the 2-D mesh model.

In still another aspect, obtaining the estimated pre-stamped shape of the workpiece used for manufacturing the product or part further includes (a) calculating a set of internal nodal forces for all triangular shell finite elements of the 2-D mesh model based on deformations with respect to the corresponding triangular shell finite elements of the 3-D mesh model; (b) obtaining a set of projected nodal positions by projecting all nodes of the 3-D mesh model onto the plane, on which the 2-D mesh model is located; (c) adjusting the set of internal nodal forces by adding a nodal force adjustment at each node of the 2-D mesh model, where the nodal force adjustment is a function of the averaged nodal curvature in a direction defined by said each node of the 2-D mesh model and the corresponding projected nodal position; (d) determining whether the 2-D mesh model has converged; and if not converged, updating the 2-D mesh model due to the set of internal nodal forces and repeating (a)-(d); otherwise, designating the 2-D mesh model as the estimated pre-stamped shape of the workpiece.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

FIG. 9 is a function block diagram showing salient components of an exemplary computer, in which one embodiment of the invention may be implemented.

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Additionally, used herein, the terms "horizontal", "vertical", "upper", "lower", "top", "bottom", "right", "left", "front", "back", "rear", "side", "middle", "upwards", and "downwards" are intended to provide relative positions for the purposes of description, and are not intended to designate an absolute frame of reference. Further, the order of blocks in process flowcharts or diagrams representing one or more embodiments of the invention do not inherently indicate any particular order nor imply any limitations in the invention.

Embodiments of the invention are discussed herein with reference to FIGS. 1A-1C to FIG. 9. However, those skilled in the art will readily appreciate that the detailed description given herein with respect to these figures is for explanatory purposes as the invention extends beyond these limited embodiments.

Figure 1A:
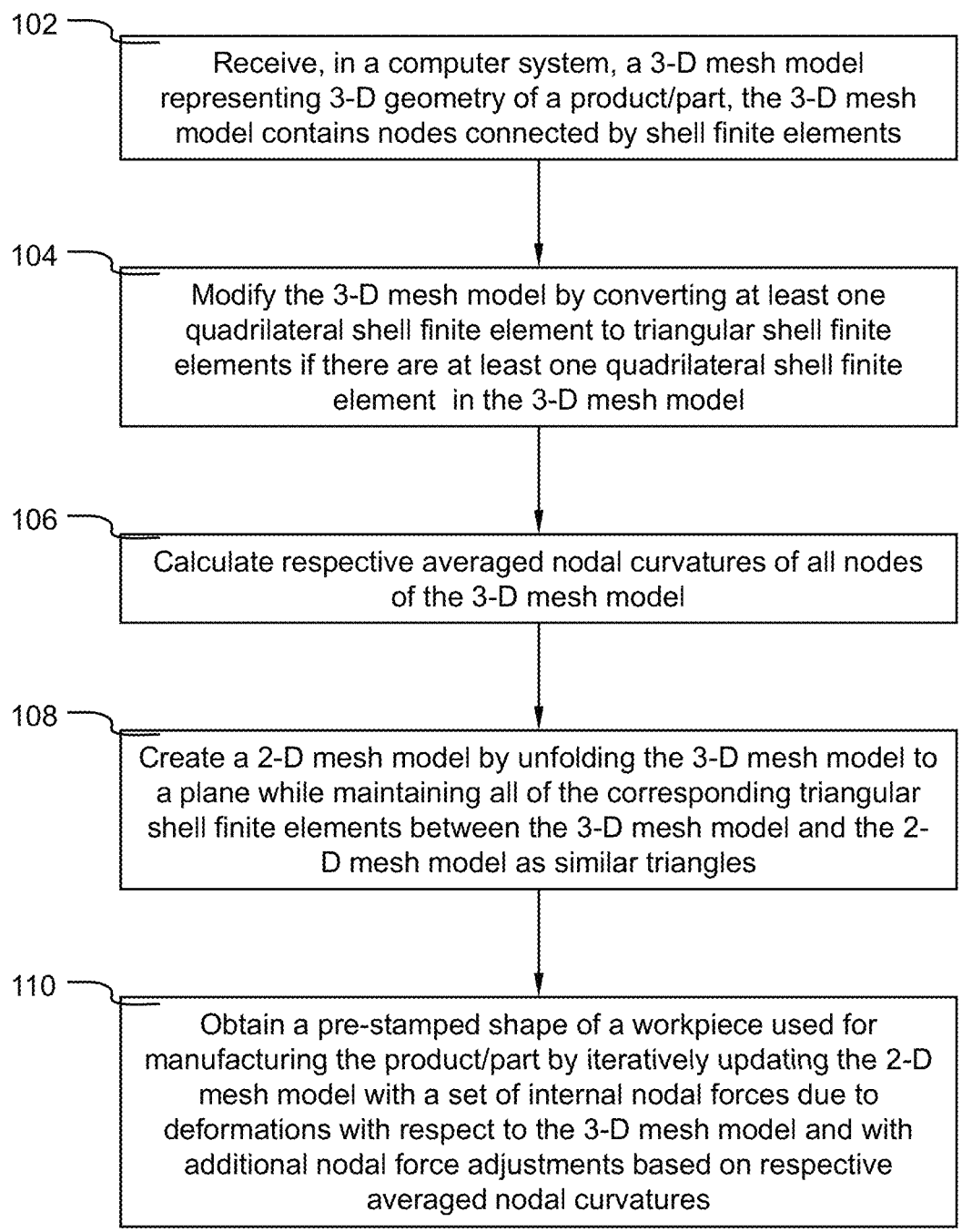
FIGS. 1A-1C are collectively a flowchart illustrating an example process of numerically estimating a pre-stamped shape of a workpiece used for manufacturing a product/part with deep draw metal stamping, according to an embodiment of the invention.
Figure 1B:
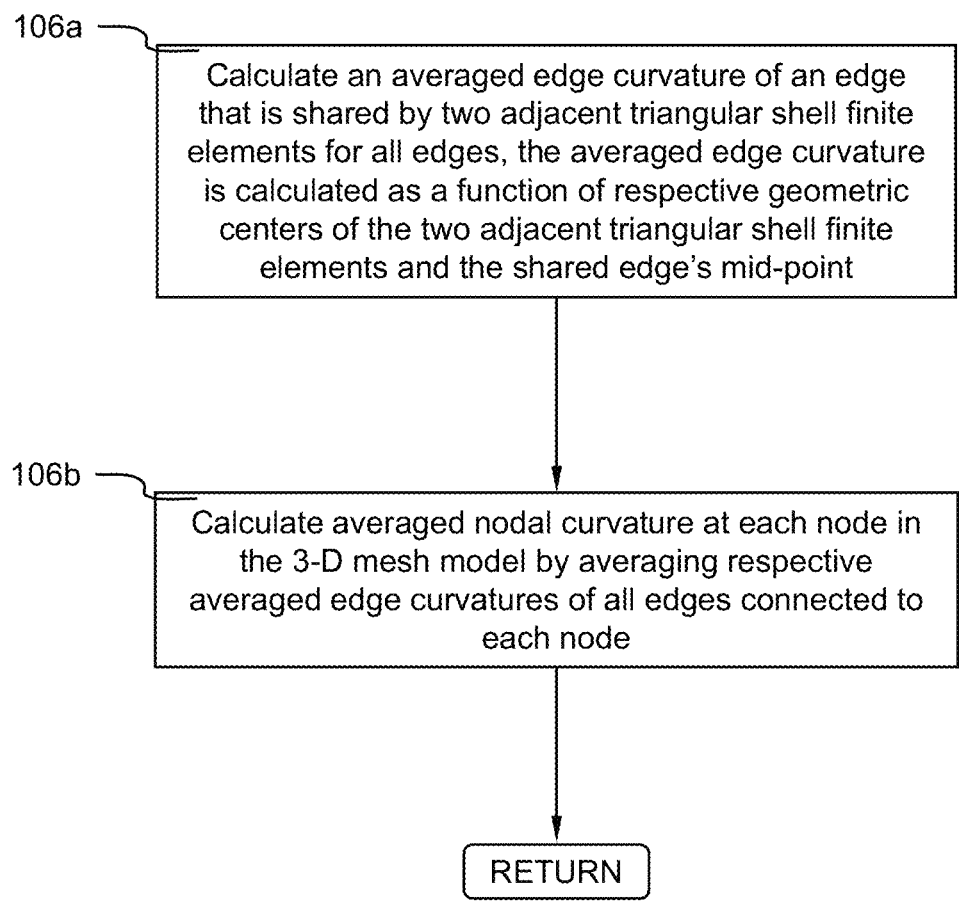
Figure 1C:
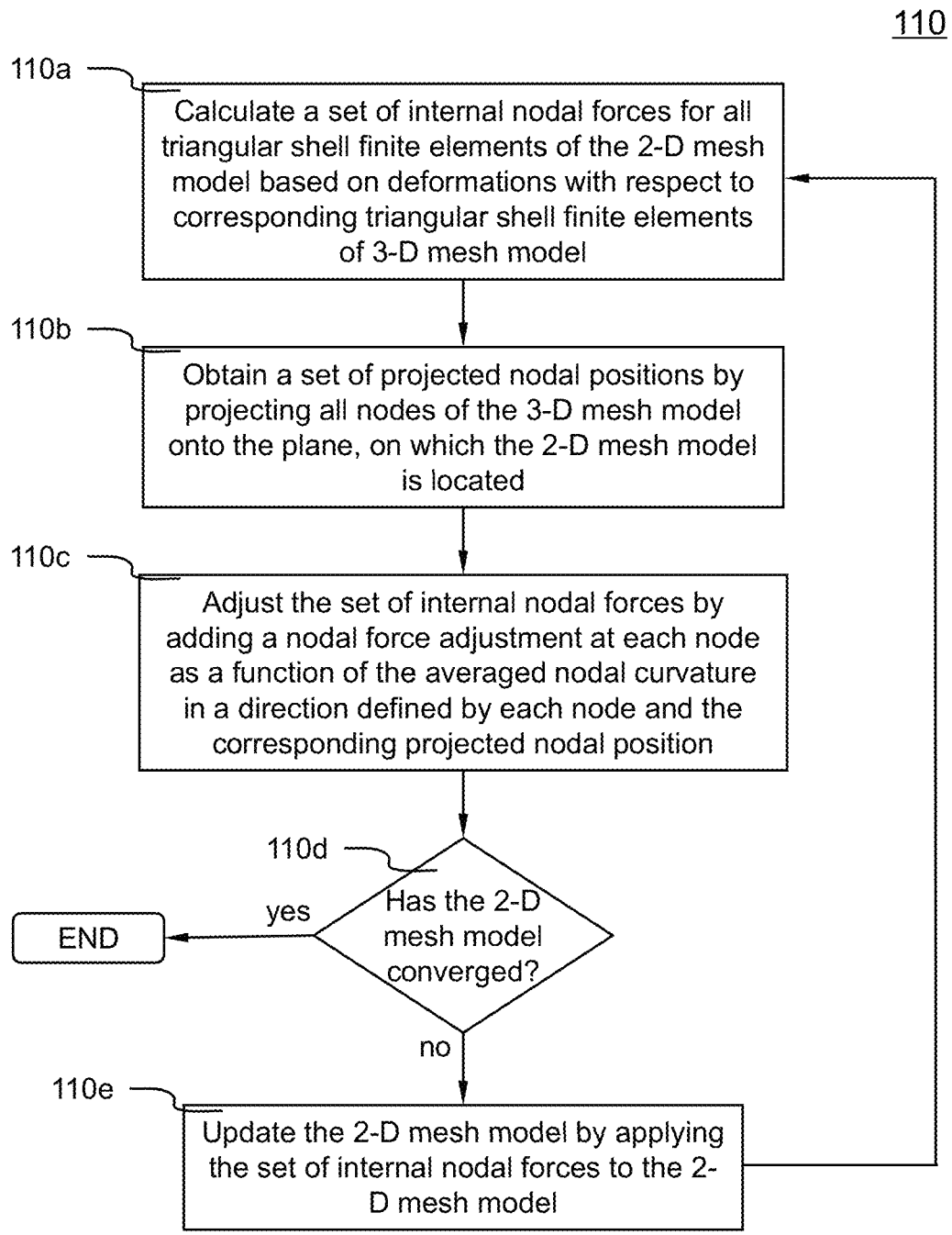

Referring first to FIGS. 1A-1C, it is collectively shown a flowchart illustrating an example process 100 of numerically estimating a pre-stamped shape of a workpiece used for manufacturing a product/part with deep draw metal stamping.

Figure 2A:
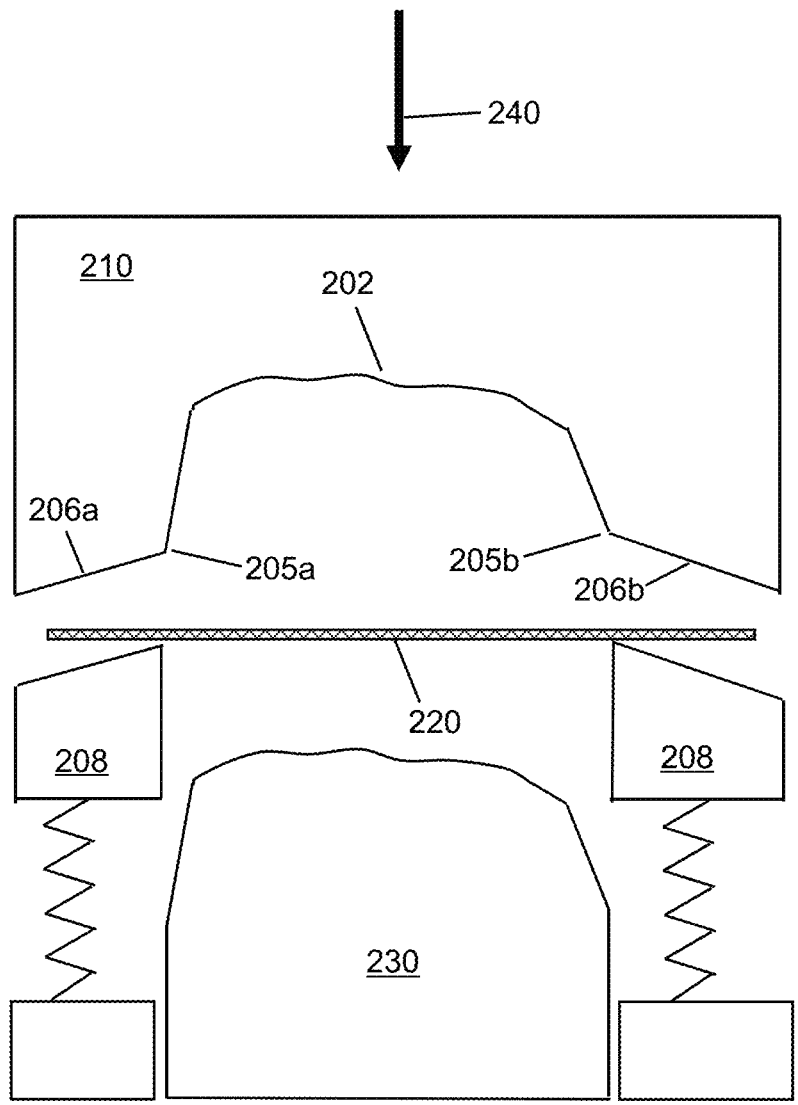
FIG. 2A is an elevation cross-section view of an example set up of a draw die for deep draw manufacturing of a sheet metal part in accordance with an embodiment of the invention.

Process 100 starts by receiving a three-dimension (3-D) mesh model representing 3-D geometry of a product/part in a computer system (e.g., computer system 900 of FIG. 9) having at least finite element analysis based application module installed thereon at action 102. The 3-D mesh model contains a number of nodes connected by a number of shell finite elements, which may be quadrilateral shell finite elements or triangular shell finite elements. The product/part is manufactured with deep drawing stamping process. An example set of the deep draw stamping process is shown as FIG. 2A. A sheet metal blank or blank 220 (i.e., an unformed sheet metal plate or workpiece before being formed) is rest on a blank holder 208 between an upper die cavity 210 and a punch 230. The blank 210 is formed into a sheet metal product/part when the die 210 is pushed down to the punch 230 in the direction of the draw axis (shown by an arrow 240). The die 210 has a product/part design section 202, and binder section 206a-b.

Figure 2B:
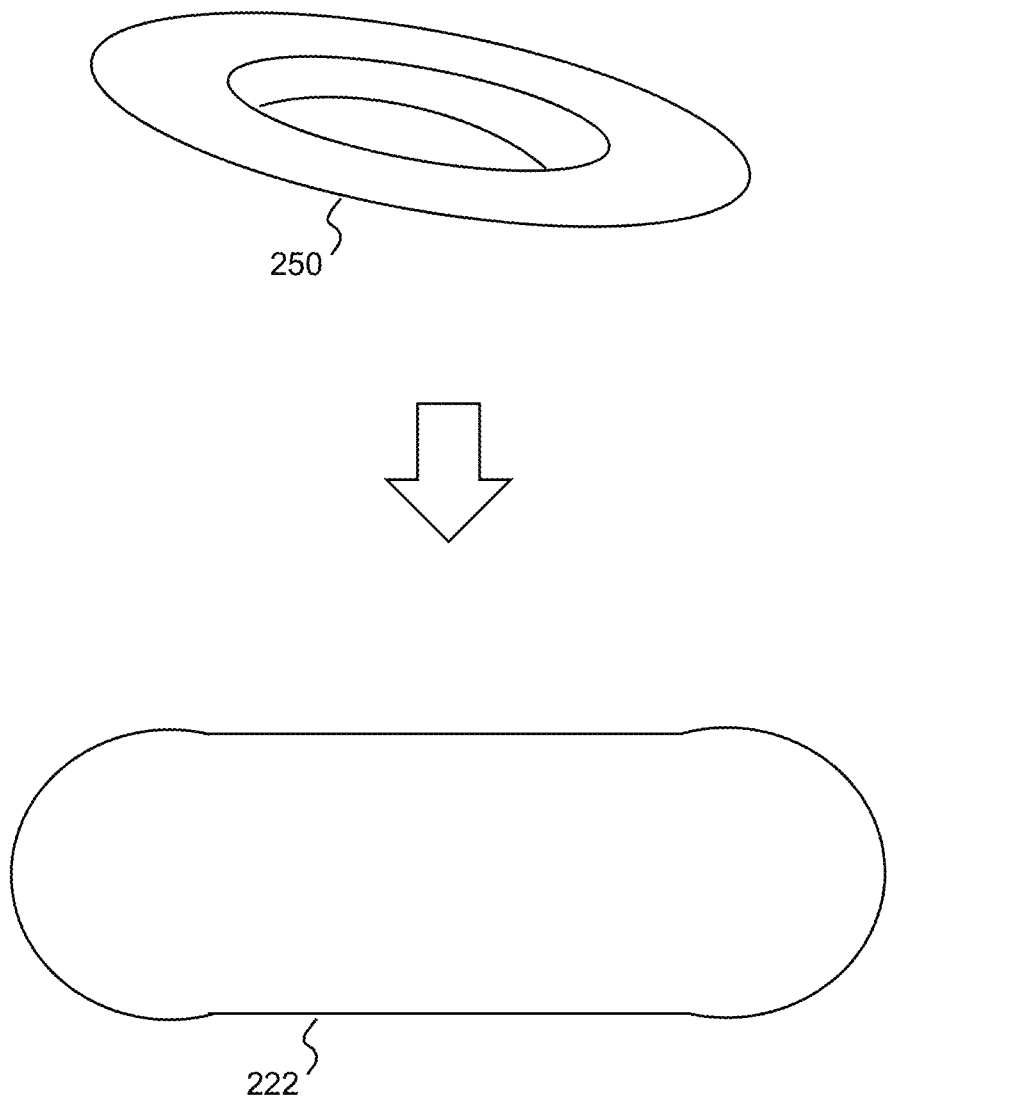
FIG. 2B is a diagram showing 3-D geometry of an example product/part manufactured with deep draw stamping and corresponding estimated pre-stamped shape of workpiece in accordance with an embodiment of the invention.

Properly prepared initial shape of a workpiece is critical to efficiently make product/part. For example, a particular shape of the workpiece would result into a final product/part without additional process steps. In order to figure out an initial pre-stamped shape of a product/part 250, the pre-stamped shape 222 shown in FIG. 2B is estimated from a 3-D geometry of the product/part 250 (e.g., product/part design section 202).

Figure 3A:
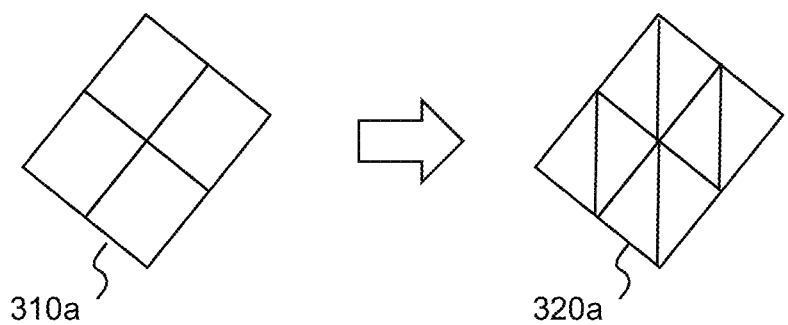
FIGS. 3A-3C are diagrams showing example conversions of quadrilateral shell finite elements to triangular shell finite elements in accordance with an embodiment of the invention.
Figure 3B:
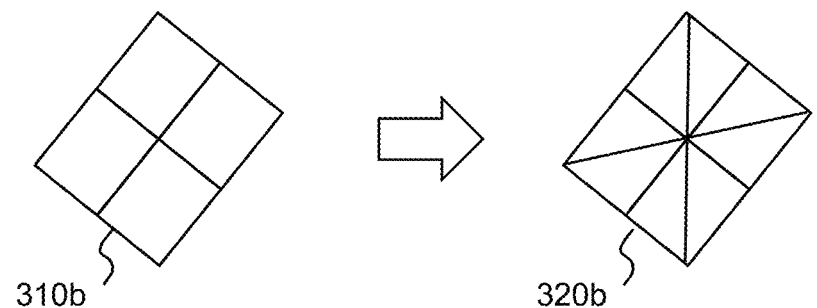
Figure 3C:
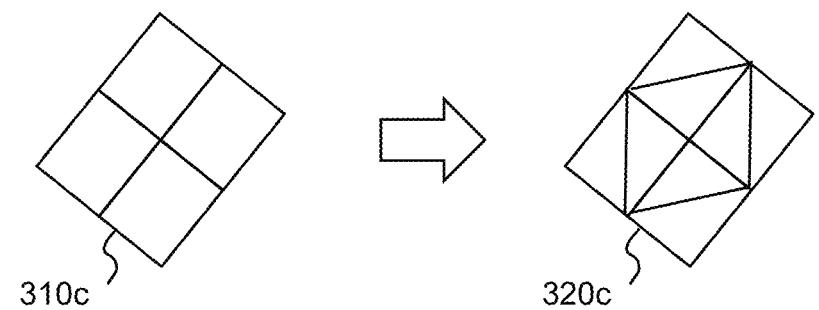

Next, at action 104, the 3-D mesh model is modified if there are at least one quadrilateral shell finite element. All quadrilateral shell finite elements are converted to triangular shell finite elements. FIGS. 3A-3C show three example conversions of quadrilateral shell finite elements 310a-310c to triangular shell finite elements 320a-320c.

Figure 4A:
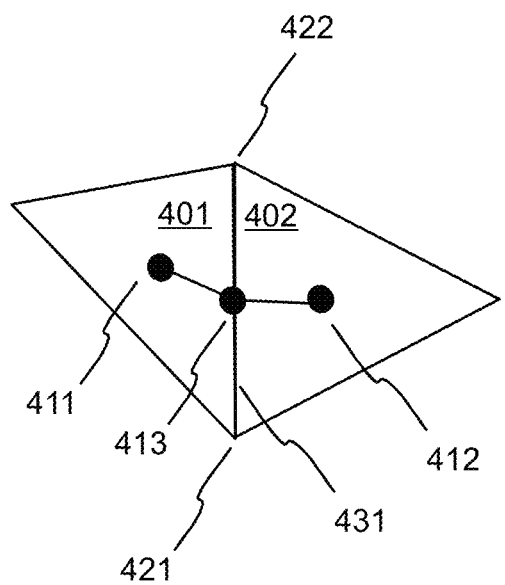
FIGS. 4A-4C are schematic diagrams showing how an example averaged nodal curvature is calculated in accordance with one embodiment of the invention.
Figure 4B:
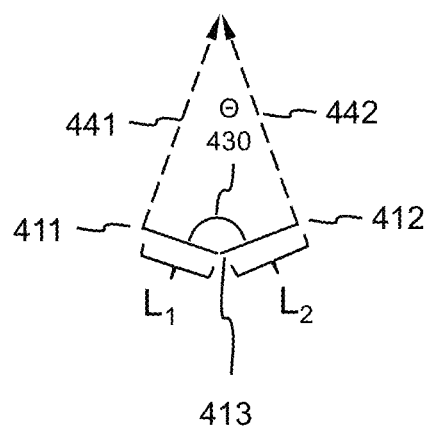

Then, at action 106, a set of averaged nodal curvatures for all nodes in the 3-D mesh model are calculated. In one embodiment, the averaged nodal curvature is calculated with the following actions shown in FIG. 1B. First at action 106a, an averaged edge curvature of an edge 431 that is shared by two adjacent triangular shell finite elements is calculated for all shared edges in the 3-D mesh model. The shared edge 431 is defined by two end nodes 421-422. The averaged edge curvature is calculated as a function of respective geometric centers 412-413 of the two adjacent triangular shell finite elements 401-402 and the shared edge's mid-point 413 shown in a plan view in FIG. 4A. In one embodiment, the averaged edge curvature $\alpha_i$ is calculated with the following formula:

$$\alpha_i = \frac{\pi - \theta}{L_1 + L_2} \text{ for each ahared edge } i$$

where:

$\theta$ is the angle 430 between two adjacent triangular shell finite elements 401-402.

$L_1$ is the distance between the geometric center 411 of the first 401 of the two adjacent triangular shell finite elements.

$L_2$ is the distance between the geometric center 412 of the second 402 of the two adjacent triangular shell finite elements.

One example technique to calculate the angle $\theta$ 430 is to use respective normal vectors 441-442 of the two adjacent triangular shell finite elements 401-402. Angle θ 430 equals to 180-deg or π, when two adjacent triangular shell finite elements are coplanar. In other words, the averaged edge curvature equals to zero (0) for two adjacent triangular shell finite elements in the same plane.

Then, at action 106b, averaged nodal curvature at each node in the 3-D mesh model is calculated by averaging respective averaged edge curvatures of all edges that are connected to each node. The averaged nodal curvature K is calculated using the following formula:

$$K = \frac{1}{n}\sum_{i=1,n} a_i$$

where:
n is the number of edges connected to the node.
$\alpha_i$ is the averaged edge curvature for edge i.

Figure 4C:
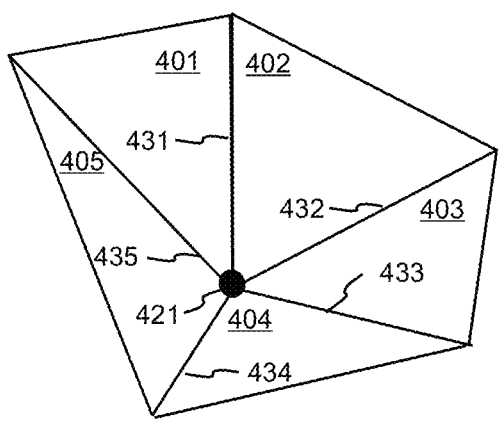

FIG. 4C shows that node 421 connects to five edges 431-435 and five triangular shell finite elements 401-405. The averaged nodal curvature K is the sum of five respective edge curvatures divided by 5. The averaged edge curvatures are calculated at action 106a.

Figure 5:
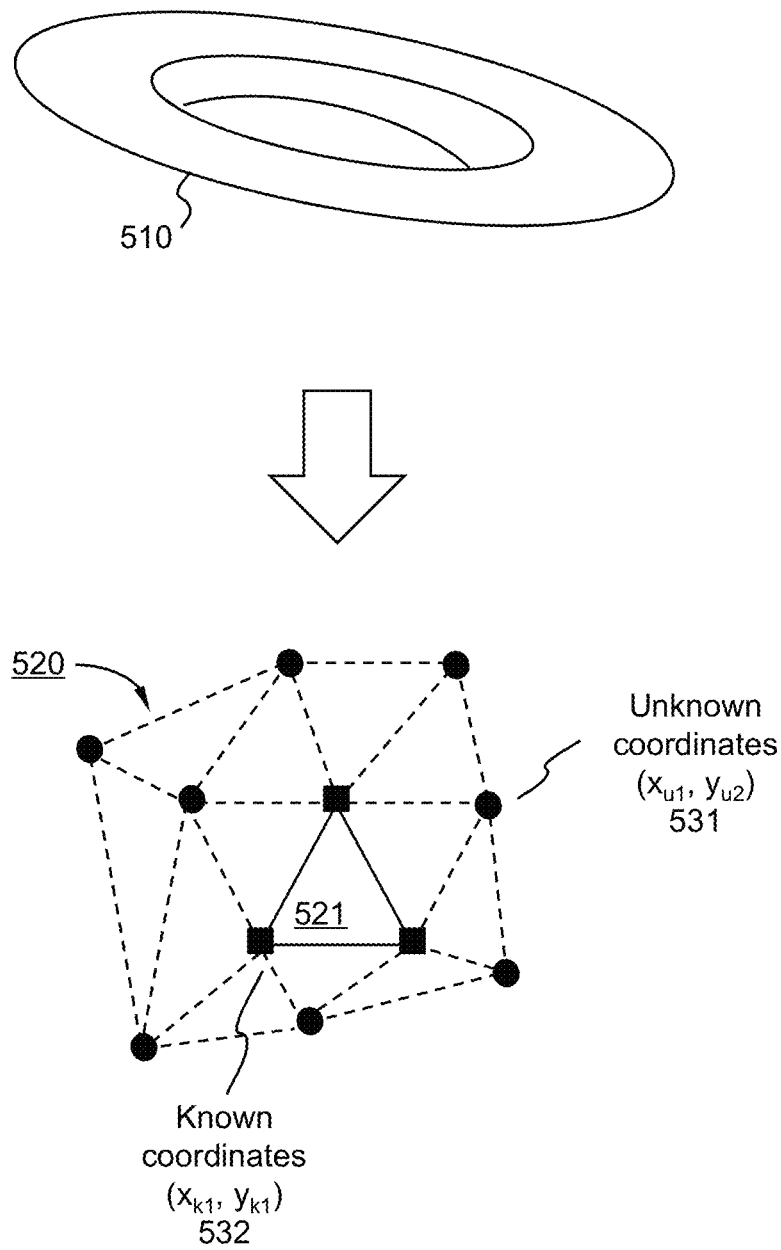
FIG. 5 is a diagram showing unfolding of a 3-D mesh model of an example product/part to a 2-D mesh model in accordance with one embodiment of the invention.

Referring back to process 100, at action 108, a two-dimension (2-D) mesh model is created by unfolding the 3-D mesh model to a plane while maintaining all corresponding triangular shell finite elements between the 3-D mesh model and the 2-D mesh model as similar triangles. FIG. 5 shows a 3-D model represents 3-D geometry 510 is unfolded into a 2-D mesh model 520. In order to maintain all corresponding finite elements as similar triangles between the 3-D mesh model and the 2-D mesh model, a set of simultaneous equations for two unknown nodal coordinates ($x_{u1}$, $y_{u2}$) 531 at each node (shown as solid dots) of the 2-D mesh model 520 are set up from theorems of similar triangles. Once all known nodal coordinates ($x_{k1}$, $y_{k1}$) 532 of nodes (shown as solid squares) at certain triangles (e.g., the first triangle 521), the number of simultaneous equations match the number of unknown nodal coordinates. A linear solution of the set of simultaneous equations determines the locations of all nodes in the 2-D mesh model.

Next, at action 110, a pre-stamped shape of a workpiece used for manufacturing the product/part is obtained by iteratively updating the 2-D mesh model with a set of internal nodal forces due to deformations with respect to the 3-D mesh model. The set of internal nodal forces further includes nodal force adjustment based on the respective averaged nodal curvatures.

Figure 6:
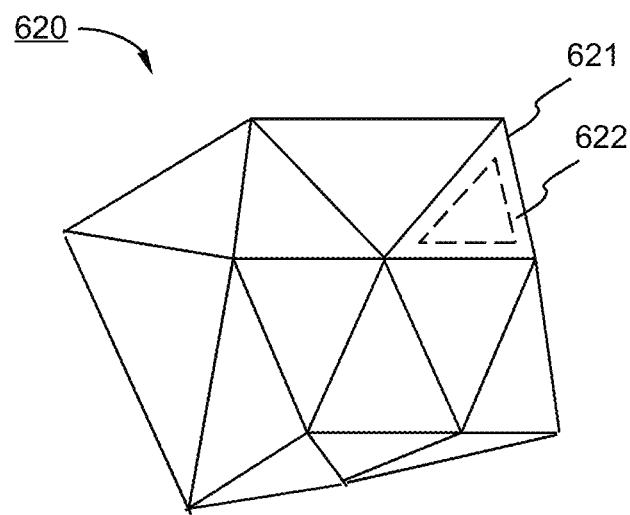
FIG. 6 is a schematic a diagram showing example deformations between corresponding shell finite elements in the 2-D mesh model and in the 3-D mesh model for calculating internal nodal forces, according to one embodiment of the invention.

Details of action 110 are shown in FIG. 1C. At action 110a, a set of internal nodal forces are calculated for all triangular shell finite elements of the 2-D mesh model based on deformations with respect to corresponding triangular shell finite elements of the 3-D mesh model. FIG. 6 shows an example 2-D mesh model 620 contains a number of triangular shell finite elements. To demonstrate the deformation, one example triangular shell finite element 621 is shown to be similar but different from the corresponding triangular shell finite element 622 of the 3-D mesh model. Due to the differences (i.e., deformations), a set of internal nodal forces are calculated.

Figure 7A:
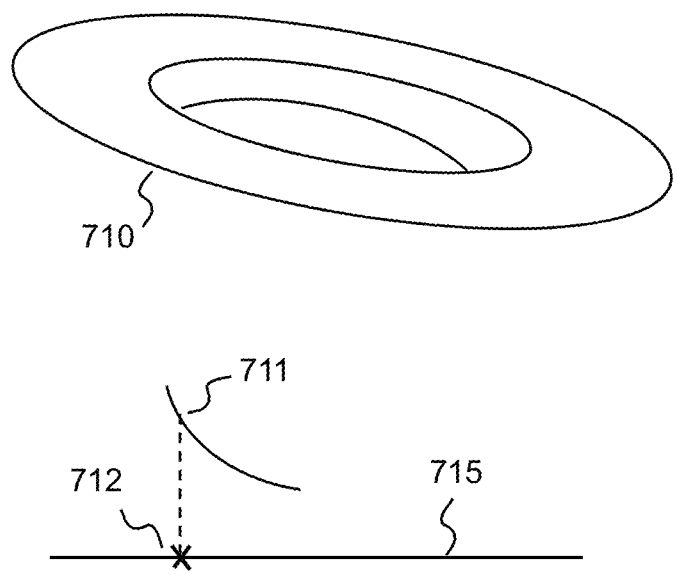
FIG. 7A is a schematic diagram showing an example projected nodal position from a 3-D mesh model onto a plane on which the 2-D mesh model is located, according to one embodiment of the invention.

Next, at action 110b, a set of projected nodal positions are obtained by projecting all nodes of the 3-D mesh model onto the plane, on which the 2-D mesh model is located. A 3-D geometry 710 represented by a 3-D mesh model is shown in FIG. 7A. A particular node 711 in the 3-D mesh model is projected to a location 712 (i.e., projected nodal position) on the plane 715, on which the 2-D mesh model is located. Projected nodal position of each and every node of the 3-D mesh model are created in each and every iteration of updating the 2-D mesh model.

Figure 7B:
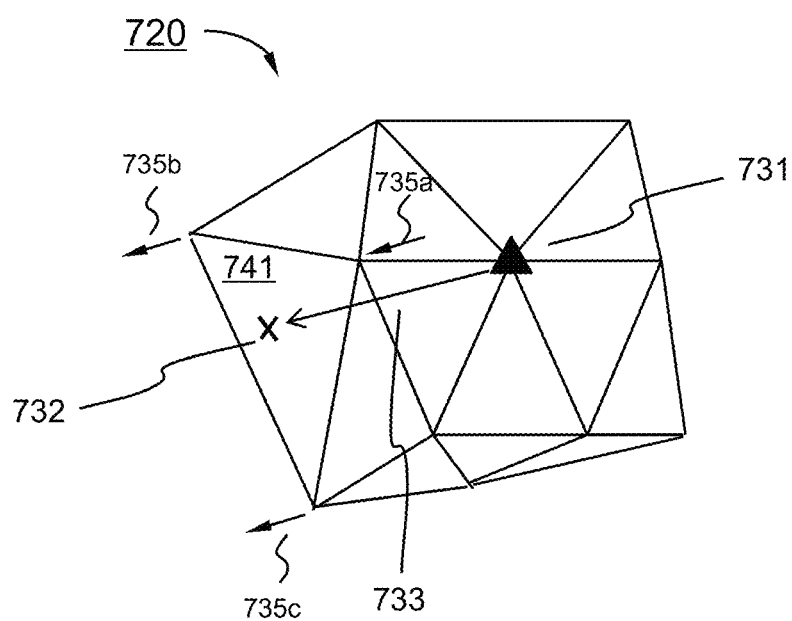
FIG. 7B is a schematic diagram showing determination of a direction of an example nodal force adjustment in accordance with an embodiment of the invention.
Figure 8:
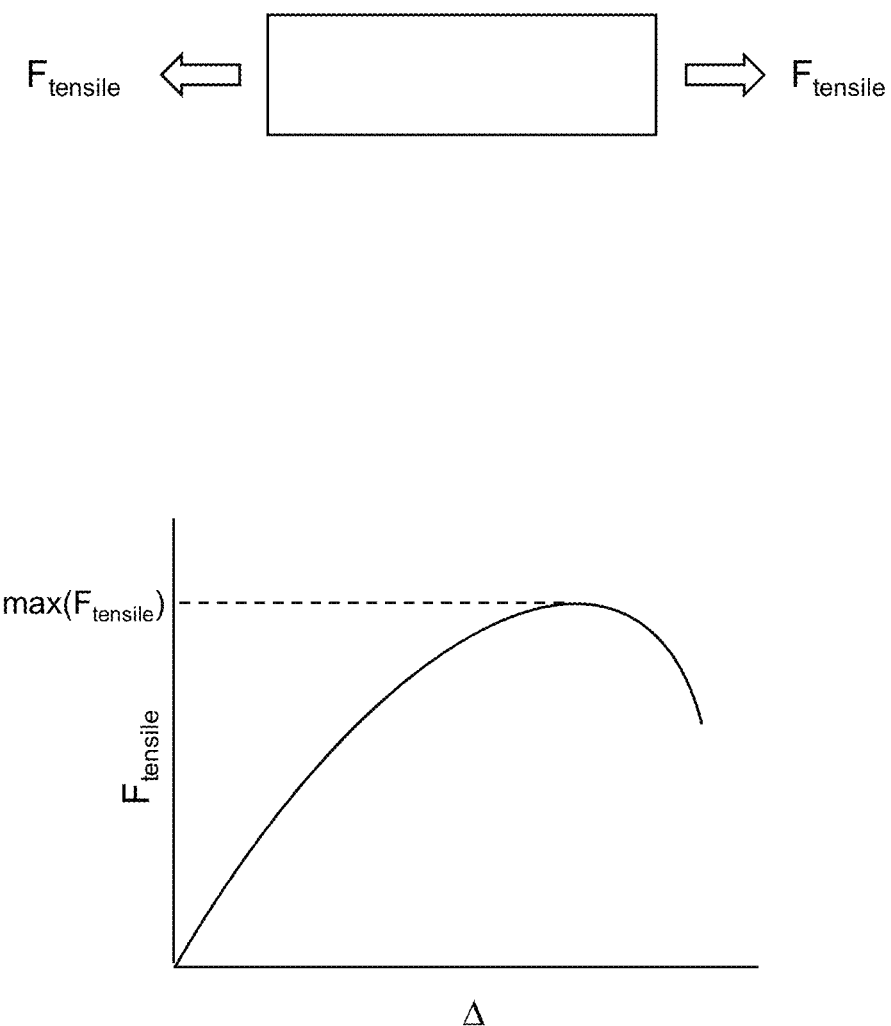
FIG. 8 is a diagram showing tensile force of a material used for calculating example nodal force adjustments, according to one embodiment of the invention.

At action 110c, the set of internal nodal forces are adjusted by adding a nodal force adjustment at each node of the 2-D mesh model 720 shown in FIG. 7B. The nodal force adjustment is calculated as a function of the averaged nodal curvature in a direction 733 defined by each node 731 (shown as a solid triangle) and the corresponding projected nodal position 732 (shown as an "X"). The nodal force adjustment is then distributed to corner nodes 735a-735c of the triangular shell finite element 741 based on a predefined distribution scheme. There are a number of predefined distribution schemes, for example, local element coordinate system. Due to update of the 2-D mesh model in each iteration, the projected nodal position of a particular node may be located in different locations or even in different triangular shell finite elements. The nodal force adjustment $F_{adj}$ for each node may be calculated using the following formula:

$$F_{adj} = c \times \max(F_{tensile}) \times K$$

where:
K is the averaged nodal curvature.
max ($F_{tensile}$) is the maximum force occurred during a uniaxial tensile experiment of a blank (i.e., workpiece) with unit width shown in FIG. 8.
c is a coefficient defined by user in the range of 0.2-0.5.

Next, at decision 110d, the 2-D mesh model is checked to determine whether the 2-D mesh model has converged, for example, the current state of the 2-D mesh model is within a tolerance of the previous state. In another embodiment, the set of internal nodal forces are within a predefined threshold.

If the decision 110d is false (i.e., the 2-D mesh model has not converged), process 100 following the 'no' branch to action 110e to update the 2-D mesh model by applying the set of internal node forces to the current 2-D mesh model. With updated 2-D mesh model, process 100 repeats actions 110a-110c until decision 110d becomes true (i.e., the 2-D mesh model has converged). Process 100 ends thereafter.

According to one aspect, the disclosure is directed towards one or more special-purpose programmed computer systems capable of carrying out the functionality described herein. An example of a computer system 900 is shown in FIG. 9. The computer system 900 includes one or more processors, such as processor 904. The processor 904 is connected to a computer system internal communication bus 902. Various software embodiments are described in terms of this exemplary computer system. After reading this description, it will become apparent to a person skilled in the relevant art(s) how to implement the invention using other computer systems and/or computer architectures.

Computer system 900 also includes a main memory 908, preferably random access memory (RAM), and may also include a secondary memory 910. The secondary memory 910 may include, for example, one or more hard disk drives 912 and/or one or more removable storage drives 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc. which is read by and written to by removable storage drive 914. As will be appreciated, the removable storage unit 918 includes a computer readable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 922 and interfaces 920 which allow software and data to be transferred from the removable storage unit 922 to computer system 900. In general, Computer system 900 is controlled and coordinated by operating system (OS) software, which performs tasks such as process scheduling, memory management, networking and I/O services.

There may also be a communications interface 924 connecting to the bus 902. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924. The computer 900 communicates with other computing devices over a data network based on a special set of rules (i.e., a protocol). One of the common protocols is TCP/IP (Transmission Control Protocol/Internet Protocol) commonly used in the Internet. In general, the communication interface 924 manages the assembling of a data file into smaller packets that are transmitted over the data network or reassembles received packets into the original data file. In addition, the communication interface 924 handles the address part of each packet so that it gets to the right destination or intercepts packets destined for the computer 900. In this document, the terms "computer program medium", "computer readable medium", "computer recordable medium" and "computer usable medium" are used to generally refer to media such as removable storage drive 914 (e.g., flash storage drive), and/or a hard disk installed in hard disk drive 912. These computer program products are means for providing software to computer system 900. The invention is directed to such computer program products.

The computer system 900 may also include an input/output (I/O) interface 930, which provides the computer system 900 to access monitor, keyboard, mouse, printer, scanner, plotter, and the likes.

Computer programs (also called computer control logic) are stored as application modules 906 in main memory 908 and/or secondary memory 910. Computer programs may also be received via communications interface 924. Such computer programs, when executed, enable the computer system 900 to perform the features of the invention as discussed herein. In particular, the computer programs, when executed, enable the processor 904 to perform features of the invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 924. The application module 906, when executed by the processor 904, causes the processor 904 to perform the functions of the invention as described herein.

The main memory 908 may be loaded with one or more application modules 906 that can be executed by one or more processors 904 with or without a user input through the I/O interface 930 to achieve desired tasks. In operation, when at least one processor 904 executes one of the application modules 906, the results are computed and stored in the secondary memory 910 (i.e., hard disk drive 912). Results of the analysis (e.g., computed pre-stamped shape of the workpiece) are reported to the user via the I/O interface 930 either in a text or in a graphical representation upon user's instructions.

Although the invention has been described with reference to specific embodiments thereof, these embodiments are merely illustrative, and not restrictive of, the invention. Various modifications or changes to the specifically disclosed exemplary embodiments will be suggested to persons skilled in the art. Whereas a very simplified 3-D geometry of a product/part has been shown and described, products/parts having more complex 3-D geometry can be used. Furthermore, for illustration simplicity, very limited number of finite elements have been used and described, the invention does not set limit to number of shell finite elements in a 2-D or 3-D mesh model. Additionally, whereas the maximum force during uniaxial tensile test has been shown and described, other forces may be used for achieving the same, for example, binder force. In summary, the scope of the invention should not be restricted to the specific exemplary embodiments disclosed herein, and all modifications that are readily suggested to those of ordinary skill in the art should be included within the spirit and purview of this application and scope of the appended claims.

We claim:

1. A method of obtaining a pre-stamped shape of a workpiece used for manufacturing a product/part comprising:
    receiving, in a computer system having at least a finite element analysis (FEA) based application module installed thereon, a three-dimensional (3-D) mesh model representing a 3-D geometry of a product or part manufactured with deep draw metal forming process, the 3-D mesh model containing a plurality of nodes connected by a plurality of shell finite elements;
    modifying, with the application module, the 3-D mesh model by converting a quadrilateral shell finite element to triangular shell finite elements;
    calculating, with the application module, respective averaged nodal curvatures of the nodes of the 3-D mesh model based on the 3-D geometry;
    creating, with the application module, a two-dimensional (2-D) mesh model by unfolding the 3-D mesh model to a plane while maintaining all of the corresponding triangular shell finite elements between the 2-D mesh model and the 3-D mesh model as similar triangles; and
    obtaining, with the application module, an estimated pre-stamped shape of a workpiece used for manufacturing the product or part by iteratively updating the 2-D mesh model with a set of internal nodal forces of the triangular shell finite elements based on deformations with respect to the corresponding triangular shell finite elements of the 3-D mesh model and with a set of nodal force adjustments based on the respective averaged nodal curvatures, whereby the shape of the converged 2-D model is the estimated pre-stamped shape of the workpiece.

2. The method of claim 1, said calculating the respective averaged nodal curvatures further comprises:

calculating, with the application module, an averaged edge curvature of an edge that is shared by two adjacent triangular shell finite elements for all edges in the 3-D mesh model; and calculating, with the application module, the averaged nodal curvature at each node in the 3-D mesh model by averaging respective averaged edge curvatures of all edges connected to said each node.

3. The method of claim 2, wherein the averaged edge curvature is calculated as a function of respective geometric centers of the two adjacent triangular shell finite elements and the share edge's mid-point.

4. The method of claim 1, said creating the two-dimensional (2-D) mesh model further comprises solving a set of simultaneous equations for two unknown nodal coordinates at each node of the 2-D mesh model, the simultaneous equations being set up from theorems of similar triangles for the corresponding triangular shell finite elements between the 3-D mesh model and the 2-D mesh model.

5. The method of claim 1, said obtaining the estimated pre-stamped shape of the workpiece used for manufacturing the product or part further comprises:
(b) obtaining, with the application module, a set of projected nodal positions by projecting all nodes of the 3-D mesh model onto the plane, on which the 2-D mesh model is located;
(c) adjusting, with the application module, the set of internal nodal forces by adding a nodal force adjustment at each node of the 2-D mesh model, the nodal force adjustment being a function of the averaged nodal curvature in a direction defined by said each node of the 2-D mesh model and the corresponding projected nodal position;
(d) determining, with the application module, whether the 2-D mesh model has converged; and
if not converged, updating, with the application module, the 2-D mesh model due to the set of internal nodal forces and repeating (b)-(d);
otherwise, designating the 2-D mesh model as the estimated pre-stamped shape of the workpiece.

6. A system for obtaining a pre-stamped shape of a workpiece used for manufacturing a product/part comprising:
a memory for storing computer readable code for at least a finite element analysis (FEA) based application module;
at least one processor coupled to the memory, said at least one processor executing the computer readable code in the memory to cause the application module to perform operations of:
receiving a three-dimensional (3-D) mesh model representing a 3-D geometry of a product or part manufactured with deep draw metal forming process, the 3-D mesh model containing a plurality of nodes connected by a plurality of shell finite elements;
modifying the 3-D mesh model by converting a quadrilateral shell finite element to triangular shell finite elements;
calculating respective averaged nodal curvatures of all nodes of the 3-D mesh model based on the 3-D geometry;
creating a two-dimensional (2-D) mesh model by unfolding the 3-D mesh model to a plane while maintaining all of the corresponding triangular shell finite elements between the 2-D mesh model and the 3-D mesh model as similar triangles; and obtaining an estimated pre-stamped shape of a workpiece used for manufacturing the product or part by iteratively updating the 2-D mesh model with a set of internal nodal forces of the triangular shell finite elements based on deformations with respect to the corresponding triangular shell finite elements of the 3-D mesh model, and with a set of nodal force adjustments based on the respective averaged nodal curvatures, whereby the shape of the converged 2-D model is the estimated pre-stamped shape of the workpiece.

7. The system of claim 6, said calculating the respective averaged nodal curvatures further comprises:
calculating an averaged edge curvature of an edge that is shared by two adjacent triangular shell finite elements for all edges in the 3-D mesh model; and
calculating the averaged nodal curvature at each node in the 3-D mesh model by averaging respective averaged edge curvatures of all edges connected to said each node.

8. The system of claim 7, wherein the averaged edge curvature is calculated as a function of respective geometric centers of the two adjacent triangular shell finite elements and the share edge's mid-point.

9. The system of claim 6, said creating the two-dimensional (2-D) mesh model further comprises solving a set of simultaneous equations for two unknown nodal coordinates at each node of the 2-D mesh model, the simultaneous equations being set up from theorems of similar triangles for the corresponding triangular shell finite elements between the 3-D mesh model and the 2-D mesh model.

10. The system of claim 6, said obtaining the estimated pre-stamped shape of the workpiece used for manufacturing the product or part further comprises:
(b) obtaining a set of projected nodal positions by projecting all nodes of the 3-D mesh model onto the plane, on which the 2-D mesh model is located;
(c) adjusting the set of internal nodal forces by adding a nodal force adjustment at each node of the 2-D mesh model, the nodal force adjustment being a function of the averaged nodal curvature in a direction defined by said each node of the 2-D mesh model and the corresponding projected nodal position;
(d) determining whether the 2-D mesh model has converged; and
if not converged, updating the 2-D mesh model due to the set of internal nodal forces and repeating (b)-(d);
otherwise, designating the 2-D mesh model as the estimated pre-stamped shape of the workpiece.

11. A non-transitory computer readable medium containing instructions which, when executed in one or more processors, perform a method of obtaining a pre-stamped shape of a workpiece used for manufacturing a product/part, the method comprising:
receiving a three-dimensional (3-D) mesh model representing a 3-D geometry of a product or part manufactured with deep draw metal forming process, the 3-D mesh model containing a plurality of nodes connected by a plurality of shell finite elements;
modifying the 3-D mesh model by converting a quadrilateral shell finite element to triangular shell finite elements;
calculating respective averaged nodal curvatures of all nodes of the 3-D mesh model based on the 3-D geometry;
creating a two-dimensional (2-D) mesh model by unfolding the 3-D mesh model to a plane while maintaining all of the corresponding triangular shell finite elements between the 2-D mesh model and the 3-D mesh model as similar triangles; and obtaining an estimated pre-stamped shape of a workpiece used for manufacturing the product or part by iteratively updating the 2-D mesh model with a set of internal nodal forces of the triangular shell finite elements based on deformations with respect to the corresponding triangular shell finite elements of the 3-D mesh model, and with a set of nodal force adjustments based on the respective averaged nodal curvatures, whereby the shape of the converged 2-D model is the estimated pre-stamped shape of the workpiece.

12. The non-transitory computer readable medium of claim 11, said calculating the respective averaged nodal curvatures further comprises:

calculating an averaged edge curvature of an edge that is shared by two adjacent triangular shell finite elements for all edges in the 3-D mesh model; and calculating the averaged nodal curvature at each node in the 3-D mesh model by averaging respective averaged edge curvatures of all edges connected to said each node.

13. The non-transitory computer readable medium of claim 12, wherein the averaged edge curvature is calculated as a function of respective geometric centers of the two adjacent triangular shell finite elements and the share edge's mid-point.

14. The non-transitory computer readable medium of claim 12, said creating the two-dimensional (2-D) mesh model further comprises solving a set of simultaneous equations for two unknown nodal coordinates at each node of the 2-D mesh model, the simultaneous equations being set up from theorems of similar triangles for the corresponding triangular shell finite elements between the 3-D mesh model and the 2-D mesh model.

15. The non-transitory computer readable medium of claim 12, said obtaining the estimated pre-stamped shape of the workpiece used for manufacturing the product or part further comprises:

(b) obtaining a set of projected nodal positions by projecting all nodes of the 3-D mesh model onto the plane, on which the 2-D mesh model is located;

(c) adjusting the set of internal nodal forces by adding a nodal force adjustment at each node of the 2-D mesh model, the nodal force adjustment being a function of the averaged nodal curvature in a direction defined by said each node of the 2-D mesh model and the corresponding projected nodal position;

(d) determining whether the 2-D mesh model has converged; and if not converged, updating the 2-D mesh model due to the set of internal nodal forces and repeating (b)-(d);

otherwise, designating the 2-D mesh model as the estimated pre-stamped shape of the workpiece.

* * * * *